A. F. TUCKER.
CORN TOPPING MACHINE.
APPLICATION FILED MAY 24, 1913.

1,135,079.

Patented Apr. 13, 1915.
3 SHEETS—SHEET 1.

UNITED STATES PATENT OFFICE.

ARTHUR F. TUCKER, OF WILLIAMSBURG, KANSAS.

CORN-TOPPING MACHINE.

1,135,079.

Specification of Letters Patent.

Patented Apr. 13, 1915.

Application filed May 24, 1913. Serial No. 769,775.

*To all whom it may concern:*

Be it known that I, ARTHUR F. TUCKER, a citizen of the United States, residing at Williamsburg, in the county of Franklin and State of Kansas, have invented certain new and useful Improvements in Corn-Topping Machines, of which the following is a specification.

This invention has reference to improvements in corn topping machines and it aims generally to provide a topping machine which is adapted for attachment to a wagon body and is designed primarily for cutting off the heads of Kafir corn, broom corn, cane, etc., and for delivering the heads into a suitable receptacle adapted to be employed in connection with the invention.

More especially the invention contemplates the provision of operating mechanism which may be readily attached to and detached from a wagon body, which includes a pair of endless conveyers set at an angle to each other, one of the conveyers adapted to feed the corn stalk to the cutting blade of the machine, and the other adapted to convey the tops or the heads when severed from the stalk into the receptacle or wagon provided therefor.

A further object of the invention resides in the provision of a corn topping machine wherein the corn or other grain is acted upon after having been previously cut and conditioned by a harvesting machine, the action of the machine separating the heads or tops of the corn from the stalk to permit subsequent use of either, independent of the other.

The above and additional objects are accomplished by such means as are illustrated in their preferred embodiment in the accompanying drawings, described in the following specification and then more particularly pointed out in the appended claim forming a part of this application.

Figure 1:
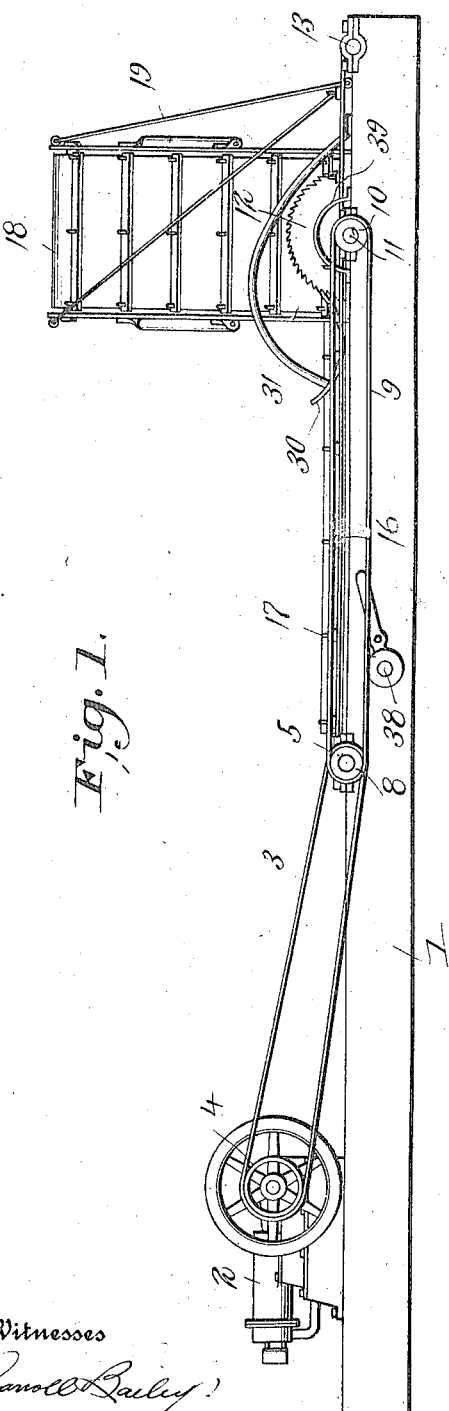
Figure 2:
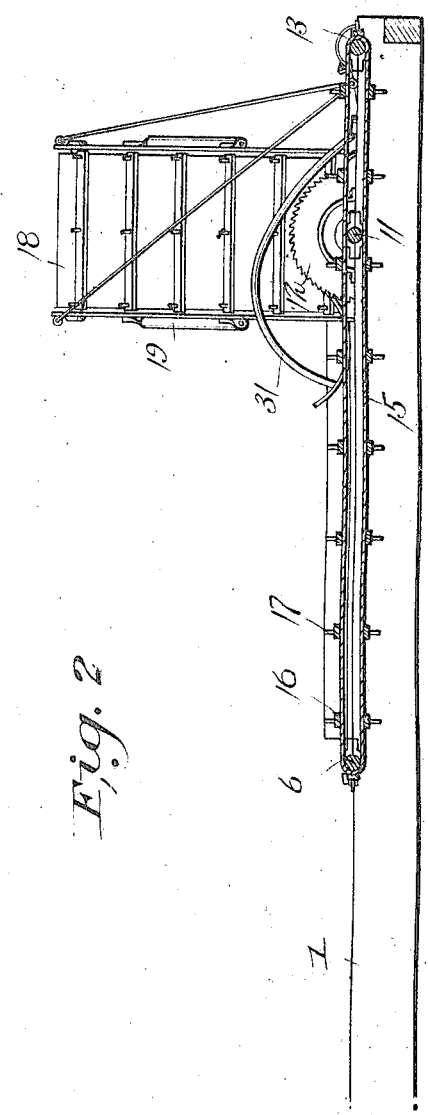
Figure 3:
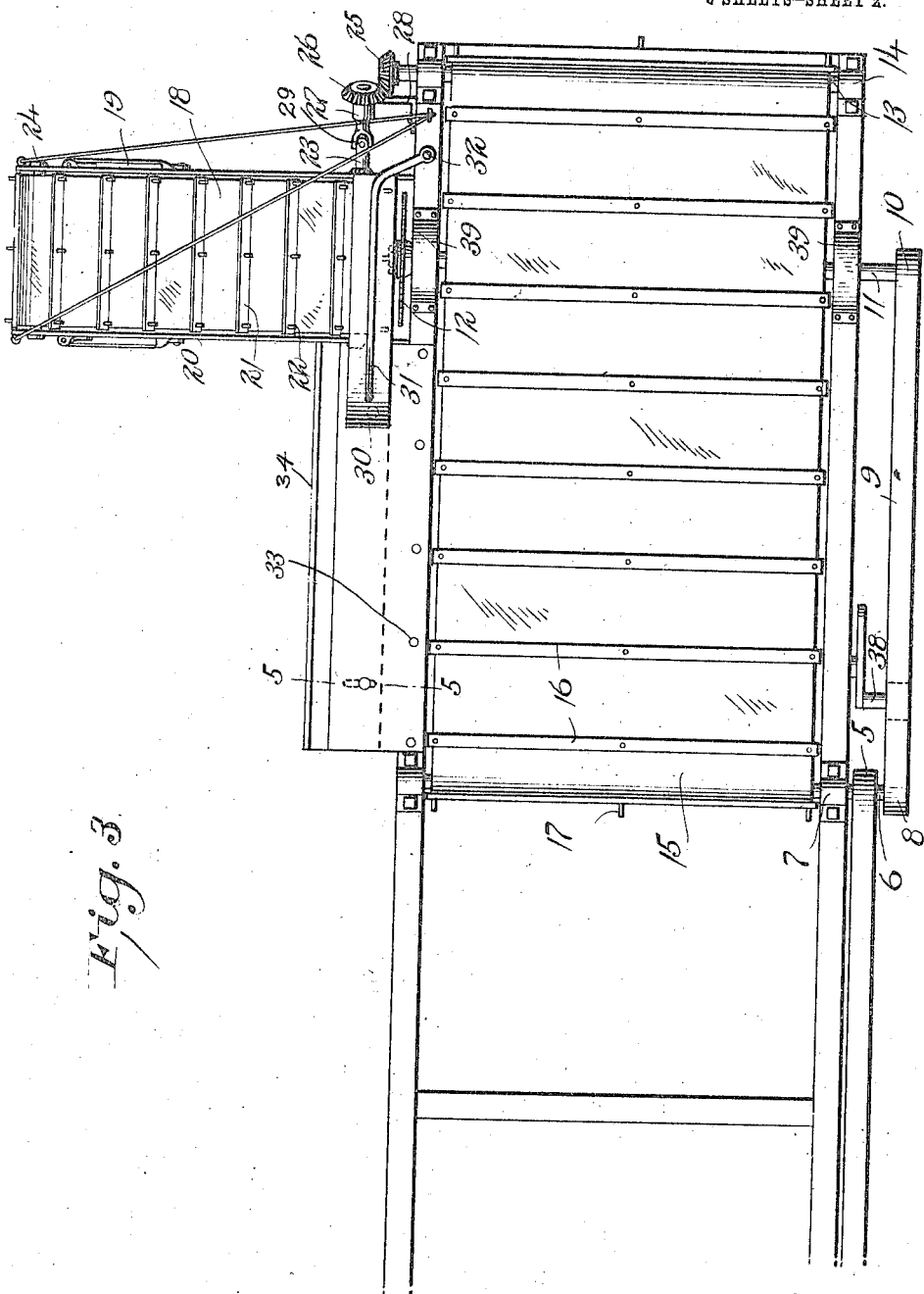
Figure 4:
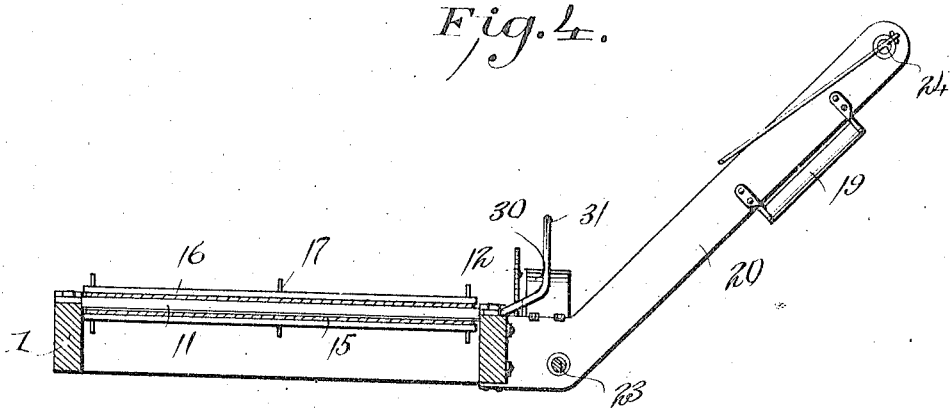
Figure 5:
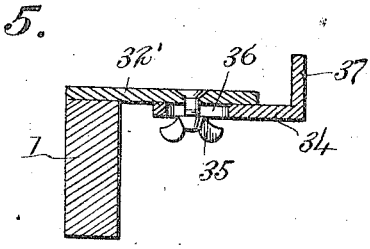

In describing the invention in detail reference will be had to the accompanying drawings wherein like characters denote like or corresponding parts throughout the several views and in which:

Figure 1 is a side elevation of a machine constructed in accordance with my invention; Fig. 2 is a longitudinal sectional view; Fig. 3 is a top plan view; Fig. 4 is a cross sectional view, one of the conveyers being shown in elevation; and Fig. 5 is an enlarged section on the line 5—5 of Fig. 3.

Before proceeding with the description of the drawings, I desire to call particular attention to the fact that while I shall hereinafter refer to the invention as a corn topping machine, the same may be readily utilized for removing the tops or ends of sugar cane, wheat or other grains.

Referring now to the drawings wherein is illustrated the preferred form of my invention, the numeral 1 designates a wagon bed or body of any well known type, upon which the machine, comprising my invention, is adapted to be detachably connected. An engine 2 of any suitable or convenient size or type is mounted upon the wagon bed 1, at one end thereof and is connected to the machine through the medium of a belt 3 arranged over the driven pulley 4 of the engine, and a pulley 5 forming a part of the machine. The pulley 5 is keyed or otherwise fixedly secured to a shaft 6 extending transversely of the wagon body upon which it is mounted by means of suitable bearings 7 provided therefor, the bearings being detachably secured to the body to permit the entire machine to be removed therefrom if occasion demand. A second pulley 8 is mounted upon the shaft 6 adjacent the pulley 5, the pulley 8 having a belt 9 arranged thereover for imparting motion to another pulley 10 mounted upon a second shaft 11 likewise extending transversely of the wagon bed and parallel with and in spaced relation to the said first mentioned shaft 6. Upon the opposite end of the shaft 11 I provide a circular cutting blade 12, the periphery of which is provided with teeth for more effectually cutting the heads or tops of the grain or corn in a manner to be hereinafter fully described. At the rear end of the wagon body, another shaft 13 is detachably secured through the medium of removable bearings 14, the said shaft 13 and the shaft 6 having a conveyer, designated in its entirety by the numeral 15 arranged thereover, for conveying the corn or grain, after having been previously cut and conditioned by a harvesting machine, to the revolving cutting blade 12 where the heads or tops of the grain are severed, the cutting blade being disposed near the opposite end of the conveyer from the shaft 6 over which one end of the conveyer passes. Strips 16 extend transversely of the conveyer 15, the strips being uniformly spaced apart and provided with a plurality of teeth or projections 17 for more effectually conveying the grain when placed upon the conveyer by the machine operator.

A second conveyer designated in its entirety by the numeral 18 is carried by the wagon bed 1 and disposed at an angle to the first mentioned conveyer 15 and directly beneath the cutting blade 12, the said conveyer 18 extending at right angles to the conveyer 15 for elevating and conveying the heads or tops of the grain into a suitable receptacle for grain provided therefor. The wagon, when used, is adapted to be drawn along parallel with the machine beneath the extended end of the conveyer 18. To prevent injury to the conveyer 18 by the wagon (not shown), rollers 19 are secured, one upon each side of the frame 20 between the sides of which the conveyer 18 operates. Uniformly spaced apart strips 21 extend transversely of the conveyer 18, the said strips likewise being provided with projections 22 to facilitate the conveyance of the heads or grain tops throughout the length of the conveyer.

The means for operating the conveyer 18 comprises a shaft 23 disposed at the inner and lower end of the said conveyer frame within which it is journaled and over which one end of the conveyer passes, the opposite end extending over a second shaft 24 journaled within the frame 20 and extending parallel with the shaft 23. A gear wheel 25 is mounted upon one end of the shaft 13 of the conveyer 15, the gear 25 meshing into a beveled gear 26 carried by a stud shaft 27 the latter being connected to the shaft 23 as illustrated at 29 in Fig. 3 of the drawings. This arrangement of the several shafts and gears will allow the conveyer 18 to be driven or operated according to the operation of the main conveyer 15 as one of the shaft of which the said last mentioned conveyer passes imparts motion to the conveyer 18, as above described.

Having described the operation of the two conveyers, it now remains to describe the means employed for guiding the grain to the cutting blade 12 of the machine. A resilient or flexible plate member 30 is secured to the conveyer frame 20, one end of which is curved upwardly or away from the conveyer to allow the grain to pass thereunder as it is conveyed toward the forward end of the machine by the conveyer 15. To position the guide plate 30 and to support the same against upward movement I provide a rod 31 secured to the plate 30 at its curved end and to the wagon bed or body as at 32 at its rear end, this arrangement of the rod 31 at all times positioning the guide 30 directly over the head of the grain for forcing the same into the teeth of the cutting blade 12.

A plate support 32' is secured as at 33 to the wagon body 1, the said plate projecting laterally therefrom for effecting a rest or support for the heads or tops of the grain when conveyed by the conveyer 15, the said plate 32' being disposed directly beneath the guide member 30 as illustrated in said Fig. 3 of the drawings. To permit adjustment of the plate, an extension 34 is provided, the said extension being adjustably secured to the plate 32' through the medium of a thumb nut and screw 35, the latter working through an elongated slot or aperture 36 formed within the said extension 34. The outer extremity or edge of the plate 34 is extended upwardly as at 37 against the inner face of which the tops of the grain normally lie, this arrangement of the extension 34 preventing the grain tops from extending beyond the edge of the support 32', and forcing the same beneath the guide member 30 and into engagement with the blade 12 of the machine.

Any form of tightening device such as is shown at 38 may be employed for the purpose of tightening the belt 9 of the machine, while any form of guards 39 may be arranged over the shaft 11 for the obvious purpose of preventing injury to the machine operator by the revolving blade 12 of the machine.

The construction of the entire machine having been described in detail, a brief description of the operation is as follows:—
The grain after having been conditioned by a harvesting machine, is placed upon the conveyer 15 with the tops or heads thereof resting upon the plate support 32' provided therefor, the latter having been previously adjusted according to the length or size of the grain acted upon. Motion being imparted to the conveyer 15 by the engine 2, it will be seen that the grain is conveyed toward the forward end of the machine, the tops or heads thereof passing beneath the guide plate 30 where they are fed to the teeth of the cutting blade 12. The blade being rotated in the manner above set forth, readily severs the tops of the grain from the stalk, the tops falling upon the conveyer 18, while the stalks remain upon the conveyer 15 where they are deposited into a receptacle carried either independent of or upon the wagon bed 1. The tops after having been severed by the blade 12 are conveyed upwardly and at an angle to the wagon bed 1 by the conveyer 18 where they are finally deposited into either a wagon adapted to be drawn parallel with the machine or into a receptacle provided for that purpose, where they are free to be subsequently used as desired.

It will be seen from the above, taken in connection with the accompanying drawings, that the guide member 30 forces the grain into direct engagement with the revolving blade 12; that both conveyers are operated from one and the same source of motive power; and that adjustment of the support plate 32' will permit grain of various sizes to be acted upon in the manner above set forth.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent is:

In a cutting machine, the combination with an endless conveyer, of a rotary cutting blade, a substantially horizontally flat plate member supported at one side of the said conveyer, an auxiliary plate member carried by the said first mentioned plate, said auxiliary plate having a plurality of slots formed therein, means extending through said slots and engaging the said plate member for supporting the said auxiliary member in adjusted position, and a guide member arranged over the said first mentioned plate member for forcing the material to be cut into engagement with the said blade, as and for the purpose set forth.

In testimony whereof I affix my signature in presence of two witnesses.

ARTHUR F. TUCKER.

Witnesses:
R. C. CLEVENGER,
C. B. SON, Jr.